O. T. BUGG.
INNER TUBE FOR TIRES.
APPLICATION FILED AUG. 4, 1920.
1,373,485. Patented Apr. 5, 1921.
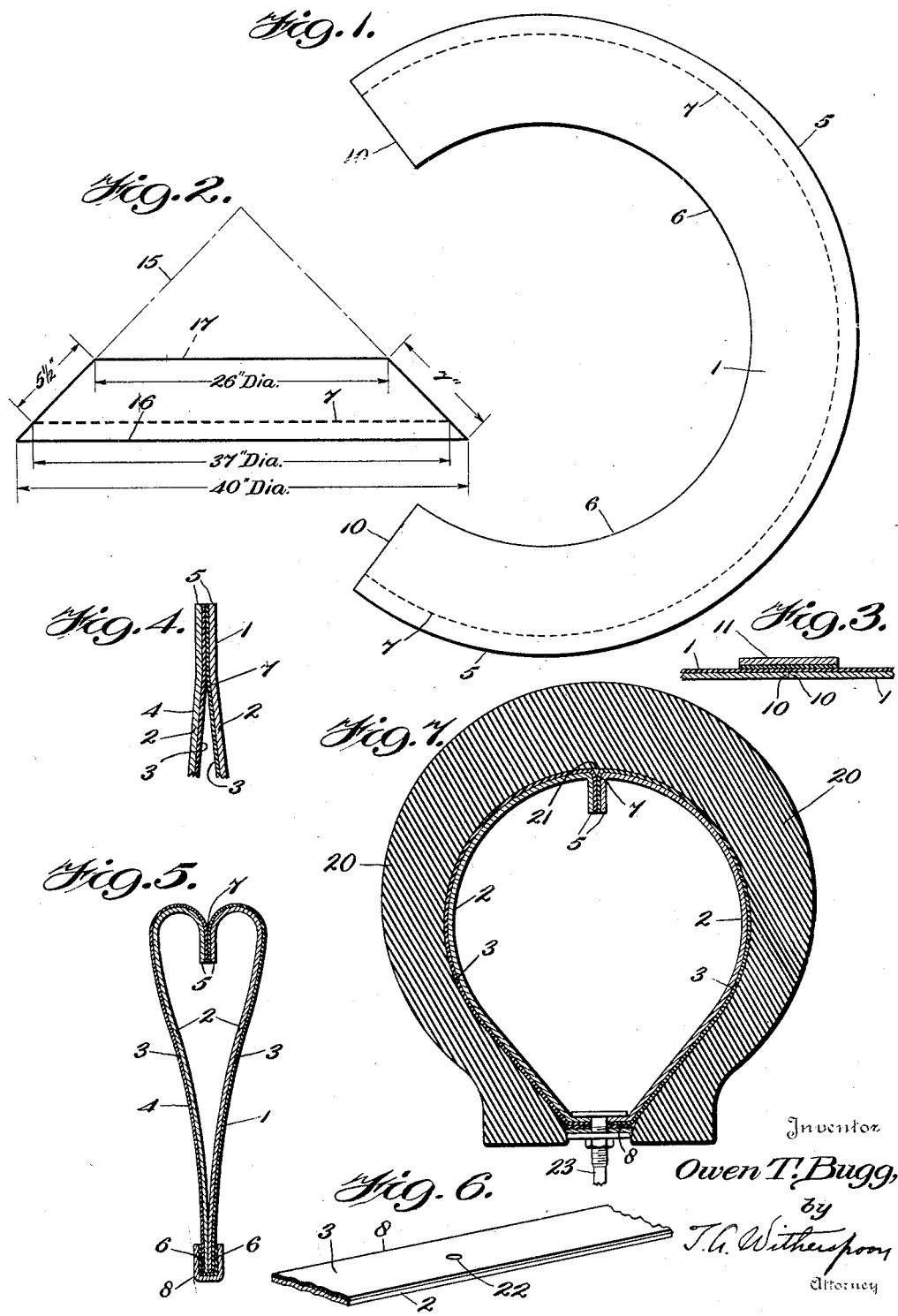

UNITED STATES PATENT OFFICE.

OWEN T. BUGG, OF POUGHKEEPSIE, NEW YORK, ASSIGNOR, BY MESNE ASSIGNMENTS, TO CANVAS INNER TUBE COMPANY, A CORPORATION OF DELAWARE.

INNER TUBE FOR TIRES.

1,373,485.     Specification of Letters Patent.    Patented Apr. 5, 1921.

Application filed August 4, 1920. Serial No. 401,161.

*To all whom it may concern:*

Be it known that I, OWEN T. BUGG, a citizen of the United States, residing at Poughkeepsie, in the county of Dutchess and State of New York, have invented certain new and useful Improvements in Inner Tubes for Tires; and I do hereby declare the following to be a full, clear, and exact description of the invention, such as will enable others skilled in the art to which it appertains to make and use the same.

This invention relates to inner tubes for tires made of non-expansible material and has for its object to provide a tube made of canvas and rubber which will be easier to construct, less costly to manufacture and more efficient in practice than those heretofore proposed.

With these and other objects in view the invention consists in the novel details of construction and combinations of parts more fully hereinafter disclosed and particularly pointed out in the claims.

Referring to the accompanying drawings, forming a part of this specification, in which like numerals designate like parts in all the views:—

Figure 1 is a diagrammatic plan view of a flat strip of canvas and rubber suitable for matching with another strip to form the tube;

Fig. 2 is a diagrammatic view illustrating the manner in which the strip, illustrated in Fig. 1, is to be cut from a flat piece of sheet material;

Fig. 3 is a sectional view illustrating how the abutting ends of the strip illustrated in Fig. 1 are secured together;

Fig. 4 is a sectional view illustrating how two of the strips are secured together to form the tube;

Fig. 5 is a sectional view illustrating the two strips after they have been joined to form the tube;

Fig. 6 is a perspective view of a flat ribbon or strip employed in joining a pair of the edges of the strips illustrated in Fig. 5; and Fig. 7 is a transverse sectional view of a pneumatic tire showing the present invention in place therein.

1 indicates an annular strip of flat material which is preferably cut from a sheet composed of a canvas or other fabric 2, on one side, and of unvulcanized rubber 3 on its other side. Another strip 4 which is an exact duplicate of the strip 1 is also cut from said material and the two outer edges 5 of said strips are abutted together as illustrated in Fig. 4.

After said edges 5 are securely joined together as indicated by the dotted line 7 in Fig. 1, the pair of strips thus joined are turned inside out so that the rubber surfaces 3 will be on the outside of the tube and the canvas portions 2 on the inside of the tube as is best shown in Fig. 5.

Another strip 8 which is much narrower than is the strip 1, and which is of straight dimensions, is also provided from the rubber-canvas material. This said strip 8 which is illustrated in Fig. 6 is folded into the shape shown in Fig. 5, and placed around the other edges 6 of said strips 1 and 4, so that its rubber surface 3 contacts with the rubber surfaces 3 of said strips 1 and 4 as indicated. While in the position indicated in Fig. 5, the said strip 8 is likewise suitably cemented in place, and the entire tube thus formed is now vulcanized so that one has a substantially integral tube of rubber 3 which is lined on its inside with canvas 2.

In other words, by the procedure above outlined, I have produced from the non-expansible material, consisting of the sheet rubber 3, and the sheet canvas 2, an inner tube having the characteristics stated.

It should be said, however, that the ends 10 of the strips 1 and 4 are preferably abutted, as indicated in Fig. 3, and another strip 11 which is similar to the strip 8, is applied with its rubber surface contacting with the rubber surfaces of the said strips 1 and 4 over the abutting ends 10 and likewise cemented in place before the vulcanizing operation. This said strip 11 of course would be disposed substantially at right angles to the strip 8.

Measured from the center of the wheel, the outer diameter of a finished inner tube of certain dimensions may be said to be 37 inches when it is deflated. The said tube, when inflated, will have an outer diameter of say 34 inches. In such case, the inner diameter of the finished tube, when deflated, would be about 26 inches, and would have the same inner diameter when inflated. It will thus be seen that if we employ non-stretchable material, as is the case in this invention, a considerable portion of the width of the material is taken up in producing the outwardly curved form which is illustrated in Fig. 7.

In other words, supposing the cross section of the finished inner tube to be about 5½ inches, when deflated, the curved form the material takes, as illustrated in Fig. 7, will have to be provided for in cutting out the flat strips 1 and 4, indicated in Fig. 4.

In order to arrive at the proper dimensions of the said strips 1 and 4, I employ a cone 15 diagrammatically illustrated in Fig. 2, and having a base 16 which is say 40 inches in diameter. I then measure from said base 16 along the inclined surface of the cone a distance of say 7 inches, whereupon the cone being of the proper dimensions, the line 17 will measure 26 inches. The non-flexible rubber-canvas material is now wrapped around this said cone and will lie flat on the surface thereof.

It is then cut along the lines 16 and 17, illustrated in Fig. 2, and so that the edges 10 illustrated in Fig. 1, will result. The strips 1 and 4 thus produced will be annular in form, and will have a width of 7 inches as above stated.

When the outer edges 5 of said strips are cemented together, however, they will unite along the dotted line 7, illustrated in Fig. 1, which is only 5½ inches from the inner edges 6.

In practice the line 7 in which the strips 1 and 4 meet is somewhat nearer the outer edges 5 of the strips 1 and 4 than has been stated above, so that when the tube is inflated inside the casing, or shoe, 20, the walls or lining 2 of said tube will readily expand or move outwardly, and thus completely fill the inner casing 2. In other words, as is best illustrated in Fig. 7, by the white space 21, there is left a considerable margin for the expansion under inflation of the non-stretchable or non-expansible material out of which this tube is made.

A hole 22 is provided in the strip 8 for the accommodation of the inflating valve 23 as will be readily understood.

It will now be clear that my improved tube is composed of the pair of annular members 1 and 4 made of non-stretchable, flat, flexible material consisting of canvas on one side and unvulcanized rubber on the other. It will further be understood that said members are united at their inner edges 6 to form an air-tight joint, that they are united at their open ends 10 to form another air-tight joint, and that they are united at their outer circumferences 5 to form in the finished tube a radially movable joint while the tube is being inflated, in order to accommodate itself to different sizes of shoes 20 and to thus tightly fill each shoe during use.

It will further be understood that since only unvulcanized rubber surfaces are brought into contact these joints will substantially integrally unite the parts during vulcanization and that therefore, the tube is of exceptional durability.

It is obvious that those skilled in the art may vary the details of construction as well as the arrangement of parts without departing from the spirit of the invention, and therefore, I do not wish to be limited to the above disclosure except as may be required by the claims.

What I claim is:—

1. An inner tube for pneumatic tires comprising a pair of annular members of non-stretchable, flat, flexible material united at their inner edges to form an air-tight joint, and united at their outer circumferences to form in the finished tube a movable joint adapted to move against the inner surface of the casing, when the tube is being inflated, substantially as described.

2. An inner tube for pneumatic tires comprising a pair of annular members of flat canvas and rubber material united at their inner edges to form an air-tight joint, and united at their outer edges by a flat joint which in the finished tube will be adapted to move against the inner surface of the casing when the tube is inflated, substantially as described.

3. An inner tube for pneumatic tires, consisting of a pair of open ended annular shaped members each composed of canvas on one side and rubber on the other side, said members having their rubber surfaces at their outer edges vulcanized together to form a joint which is disposed inside the finished tube, and having a strip of rubber coated canvas applied to their inner edges to form an air tight joint; and the open ends of said members being secured together to form another air tight joint, substantially as described.

4. An inner tube for pneumatic tires consisting of a pair of annular members of flat material having outer circumferences of a diameter larger than the outer circumference of the finished inflated tube, and inner circular edges of the same diameter as the inner circumference of the finished tube, said material consisting of rubber on one side and canvas on the other, and said members having their rubber surfaces vulcanized together at their outer circumferences and their said rubber surfaces united by a strip of canvas and rubber at their inner edges, substantially as described.

In testimony whereof I affix my signature.

OWEN T. BUGG.